United States Patent [19]
Veret et al.

[11] 3,873,191
[45] Mar. 25, 1975

[54] UNIFORM OPTICAL SURFACES AND ELEMENTS

[75] Inventors: Claude Veret, Saint Maur; Pierre Durrenberger, Antony, both of France

[73] Assignee: Office National d'Etudes et de Recherches Aerospatiales (O.N.E.R.A.), Bagneux, France

[22] Filed: Sept. 4, 1973

[21] Appl. No.: 393,794

Related U.S. Application Data

[60] Continuation-in-part of Ser. No. 176,758, Aug. 27, 1971, abandoned, which is a division of Ser. No. 49,055, June 23, 1970, abandoned.

[30] Foreign Application Priority Data

June 24, 1969 France .............................. 69.21143

[52] U.S. Cl. .................. 350/293, 350/178, 350/102
[51] Int. Cl. .............................................. G02b 5/10
[58] Field of Search .......... 350/102, 103, 178, 192, 350/293; 351/177

[56] References Cited
UNITED STATES PATENTS

| | | | |
|---|---|---|---|
| 2,284,567 | 5/1942 | French | 350/192 |
| 2,481,809 | 9/1949 | Barnes | 351/177 |
| 3,396,214 | 8/1968 | Crandon | 351/177 |

*Primary Examiner*—Vincent P. McGraw
*Assistant Examiner*—Michael J. Tokar
*Attorney, Agent, or Firm*—Karl F. Ross; Herbert Dubno

[57] ABSTRACT

A transparent or reflecting optical element, having an optical surface of given shape, is manufactured by providing a mold member whose working surface is exactly complementary to the shape of the optical surface to be produced, and a base or support member having a geometrically simple working surface of a shape approximating that of the desired optical surface. The working surface of the mold member is lined with a film of an anti-adhesive material and a settable resin is cast between the confronting working surfaces of the mold and support members. After setting of the resin, the members are separated and there is obtained a rigid optical element whose body consists of the support member and whose optical surface is defined by a thin layer of that resin with the anti-adhesive film adhering thereto.

10 Claims, 4 Drawing Figures

PATENTED MAR 25 1975　　　　　　　　　　　　　　　3,873,191

UNIFORM OPTICAL SURFACES AND ELEMENTS

This application is a continuation-in-part of our co-pending application Ser. No. 176,758 filed Aug. 27, 1971 as a division of our abandoned application Ser. No. 49,055 of June 23, 1970 and now likewise abandoned.

Our present invention relates to the production of optical elements, reflecting or refracting, such as mirrors, lenses and the like, for optical instruments for observation and/or measurement purposes.

There are available today two known methods of manufacturing such elements.

In the first method, known as "shaping," a blank of dimensionally stable material, such as metal or glass, is machined on one or more of its optical surfaces to a final shape by grinding and polishing with abrasive tools. Actually this process enables the production of only plane or spherical surfaces, as the very nature of conventional grinding technique makes it impossible to obtain incurved shapes differing from that of a sphere.

If the surfaces desired are of a different shape, for instance aspherical, it is then necessary to perform local retouchings, involving numerous verifications. The operations involved are lengthy and expensive, and yet their results are uncertain. In any case they are incompatible with either small-scale or large-scale production.

In the second method, known as "casting," the optical elements are produced by molding thermoplastic or thermosetting resins by means of glass or metal molds whose working surfaces are ideally supposed to present the accuracy of shape and degree of polish desired. Yet because of the intrinsic properties of these resins and the phenomena inherent in hardening or polymerization, such as shrinkage and temperature rise, the elements obtained are not very rigid and not very stable with time, all the more so because the resins have high thermal coefficients of expansion, causing strains during use whenever the temperature changes. This second process is therefore used in practice only for the manufacture of elements where a low degree of optical quality is called for, such as spectacle glasses, rear light reflectors and the like.

The objects of our invention are:

to provide, economically and quickly, optical elements such as diopters, lenses, SCHMIDT plates, mirrors etc., with sufficient accuracy for enabling their use in optical instruments such as astronomical refractors and reflectors, theodolites, photographic lenses and the like;

to permit the production of such elements without retouching operations;

to facilitate the manufacture of large-size elements of this type;

more particularly, to provide elements of this description whose optical surfaces are neither plane nor spherical;

to permit the production of trihedral, concave or other elements of a shape not conducive to the use of optical grinding and polishing techniques;

to supply high-quality reflectors which are stable, light and rigid.

In manufacturing, pursuant to this invention, a transparent or reflecting optical element having an optical surface of a given shape, we provide two forming members, i.e., on the one hand a rigid mold member whose working surface has been shaped by optical finishing techniques to be exactly complementary to the shape of the optical surface to be produced, and on the other hand a rigid base or support member having a geometrically simple working surface approximating as closely as possible that of the desired optical surface; the latter working surface can be produced by conventional machining methods, such as milling, turning and trueing, or again by casting or die-stamping. After the working surface of the mold member has been lined with a film of an anti-adhesive material there is deposited on the two working surfaces of the mold member or the support member a layer of a polymerizable liquid bonding agent or cement whereupon the other member is applied to the first one in such a way that their working surfaces are facing each other. When polymerization has taken place, the members are separated. There is thus obtained a rigid optical element whose body consists of the support or base member and whose optical surface is defined by a thin layer of polymerized cement with the anti-adhesive film adhering thereto.

In the manufacture of a reflecting element this optical surface is rendered reflective by, for instance, vacuum deposition of a metallic film.

In the manufacture of a dioptric element (lens) the support or base member consists of a stable transparent material, such as glass. Two optical surfaces, serving respectively for the entrance and the exit of light rays can be formed thereon by two operations as defined above which may be carried out simultaneously by means of two mold members coacting with opposite surfaces of the support member.

After the working surface of the mold member has been covered with an anti-adhesive film, one of the members may be laid on a table with its working surface directed upwardly whereupon there is placed on the center of that surface a suitable quantity of the polymerizable liquid cement. Thus it is the weight of the other member, placed on the first one by its working surface, which causes the deposited cement to travel toward the periphery of the members and to fill completely the gap between the two surfaces, even though they are not strictly conjugate in shape.

If desired, the weight of the upper member may be augmented by an additional load.

Advantageously, after polymerization the separation of the members is preceded by a slight heating. This is carried out in such a way as to avoid the occurrence of sharp temperature rises.

When the element to be produced has an optical surface of marked concavity or convexity, the member having a concave working surface is placed with that working surface upwardly. This insures the confinement of the bonding agent in its mobile state so that enough polymer is available for a complete filling of the gaps and avoidance of air bubbles in the cement.

Generally, the support member may be made of any stable mineral material; the resulting composite optical element is as accurate, as rigid and as stable as a unitary optical element of the same basic material. The layer of polymerized cement is so thin that the effect of its shrinkage, or expansion, under heat is negligible. The average thickness of that layer may be a fraction of 1 millimeter; in the case of flat surfaces, such as that of a reflecting trihedron, it may range between 10 and 500 microns.

Our invention makes possible a considerable simplification of the structure of photographic lenses or the like by reducing the number of their constituent lenses. Ordinarily, this number is high because of the fact that the optician, for reasons of economy of manufacture, for the most part uses only lenses shaped with spherical faces.

For a nontransparent element such as a mirror it is also possible to use a support member of rigid opaque material such as silica or as metal as the support member. A metal has the advantage of good thermal conductivity, resulting in rapid heat dissipation to prevent excessive temperature rises which could cause dimensional distortions.

For the cement there is preferably used a resin which is polymerizable at ambient or slightly elevated temperatures, e.g., at a temperature below 50°C, such as an epoxy resin to which are added the necessary hardeners and accelerators, or a cyanoacrylic resin.

To produce dioptric elements, such as lenses, a transparent resin is chosen having a suitable index of refraction, compatible with that of the glass or other rigid transparent material used for the support member. If the index of refraction of the resin is close to that of the glass it is not necessary to polish the support member. If, for reasons related to optical correction, the operator is led to choose a glass and a resin with markedly different indices, it is advisable to polish the support member to avoid the diffusion of part of the light through the glass-resin interface.

In the case of a reflecting element the resin need not be transparent and may therefore be provided with a filler of the type conventionally used to stabilize it against shrinkage or hardening, such as comminuted carbonates (e.g., $CaCO_3$ or $K_2CO_3$) or silica. A suitable resin of this nature is marketed under the name Gelcoat. The thickness of the vacuum-deposited metallic film may range, especially in the case of a precious metal such as gold or silver, between 0.04 and 0.06 $\mu$.

The working surface of the mold member may be made of any material lending itself to the techniques of optical finishing, such as grinding and polishing. There may be selected, for instance, a glass or aluminum alloy covered with a thick deposit of chemical nickel.

The anti-adhesive agent may be a vaporizable solution of a resin, such as a vinyl resin. In many cases it is preferable to use, because of its small and uniform thickness, a film of metal deposited by vapor in vacuo. Such a film adheres only slightly to the surfaces on which it has been deposited and is completely carried away by the polymerized cement.

If the surface of the mold member is metallic, it is preferable to carry out the vapor deposition under a relatively soft (i.e., partial) vacuum, e.g., $10^{-4}$mm of mercury, in order to obtain a sufficiently weak adhesion of the metal film on the surface of the mold member.

If the optical element to be produced is a mirror, this metallic film imparts reflecting power to it.

If the element to be produced is a dioptric element, the metal film is eliminated by a suitable chemical reagent.

In the description which follows, given by way of example, reference is made to the appended drawing in which.

Figure 1:
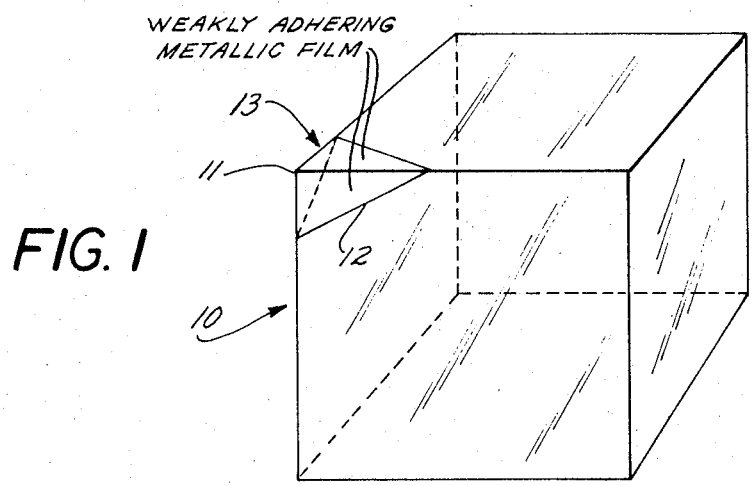
FIG. 1 is a perspective view illustrating the production of an optical element embodying our invention.

A cube 10 (FIG. 1) of glass or the like is made first, advantage being taken of the accuracy afforded by optical finishing techniques. A zone of the glass cube adjacent a corner 11 of the cube is cut away along a plane 12, thus producing a tetrahedron 13 serving as a mold member.

The tetrahedron is subjected to metallization under a vacuum, in such a way that the surfaces next to the corner 11 are lined with a thin metallic film.

Figure 3:
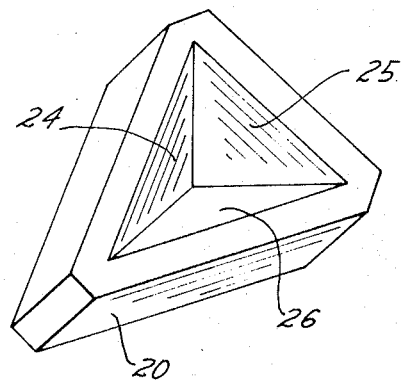
FIG. 3 is a perspective view of the completed element.

Further, by molding an aluminum alloy (FIG. 2) or by some other forming operation, we prepare a support member 20 having a recess 21 approximately reproducing the three faces of a tetrahedron meeting at one corner. Such a recess may also be obtained by deforming a sufficiently malleable metal body. On these three faces there is deposited a layer 22 of hardenable resin whose thickness has been considerably magnified in the Figure, for the sake of clarity. The layer is advantageously produced by coating with a brush. Before the layer 22 has set, the tetrahedral glass block 13 provided on its three converging faces with the vacuum-deposited metallic film 23 is placed in the recess 21. If the weight of the tetrahedron 13 is not sufficient to exert the slight pressure necessary to extrude the excess resin, an additional weight 27 of, say, 1 kg (FIG. 2) is laid on that body. Thus, the resinous surface layer 22 is deformed so that its shape is exactly that of an orthogonal trihedron. The resin is allowed to set while bonding to the metallic film. When the setting is complete the block 13 is removed; the metallic film detaches itself from that block and remains adherent to the layer of hardened resin 22. There thus results an optical element whose body, constituted by the support member 20, has three reflecting surfaces 24, 25 and 26 (FIG. 3), perpendicular to one another, and can act as a reflector of very high optical quality.

The small quantity of resin present makes it possible to avoid strains due to shrinkage and flow which would arise if the whole body of the optical element were made of resin.

In general, the thickness of the resinous layer 22 (after extrusion of the excess resin by the weighted or unweighted block 13) should be just sufficient to fill the gaps between the working surfaces of the two nearly complementary members 13 and 20 which therefore contact each other more or less directly at their points of closest approach where they may be separated from each other only by a residual resinous layer of molecular thickness supplemented by the metal film 23. In many instances the average layer thickness will be a fraction of a millimeter, particularly if the two surfaces are substantially parallel so that only the rough spots of the support member are to be evened out.

EXAMPLE 1

The metallic parting film deposited in vacuo on the glass block 13 is a gold film of 0.05 $\mu$ thickness.

For the casting operation, both the wall of the support member 20 and the trihedral faces of the metallized glass block are coated with resin. The two coated surfaces are pressed against each other to form the sandwich 13, 22, 20.

After the resin has hardened and the parts are separated, the gold film detaches itself from the glass and remains on the resin layer, adhering to the metallic suport member. The gold, having acted as an anti-adhesive agent on the glass block, now imparts reflecting power to the resin layer.

The resin is preferably an epoxy resin. Good results have been obtained with an epoxy resin known under the name of Araldite and commercially available together with a hardener therefor.

In this case the duration of polymerization varies from 15 hours to 48 hours at temperatures between 22°C and 18°C.

EXAMPLE 2

It is desired to produce a concave parabolic mirror for an astronomical reflector, with a diameter of 200 mm. The support member is a ribbed aluminum disk, the disk and its ribs having a thickness of 10 mm. The working surface of the disk is spherically concave with a radius of curvature of 1,600 mm (aperture F:4). The working surface of the mold member of shaped glass is parabolaoidally concave. The cement used is again an epoxy resin. After molding and polymerization, the layer of cement provides the variations in thickness of a few microns required to transform the spherical surface of the disk into a parabolic surface. The metal acting as an anti-adhesive and a reflector is aluminum deposited under a vacuum on the glass paraboloid.

It is thus possible to produce with the same tooling as many parabolic mirrors as desired.

EXAMPLE 3

The element to be produced is a SCHMIDT plate. The technique employed is identical with that of the preceding Example. The support member is an optically surfaced parallel-plane glass disk. The working surface of the mold member of glass has a shape complementary to that of the desired SCHMIDT plate. The cement is an Araldite. The film of aluminum is removed, after polymerization and separation, by means of a basic reagent.

Figure 2:
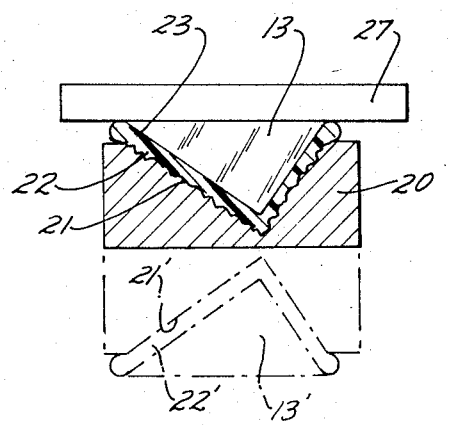
FIG. 2 is a diagrammatic view in section of an assembly used in another stage of production.

The possibility of forming two optically effective surfaces on the same support member by the process according to our invention, as noted above, has been illustrated in phantom lines in FIG. 2. Thus, a second recess 21' on the underside of support member 20 receives a resinous layer 22' which is shaped by compression between the support member and a mold member 13' similar to block 13.

In a specific instance, the tetrahedron 13 had a base length of 34 mm; the thickness of layer 22 was about 0.2 to 0.3 mm.

Figure 4:
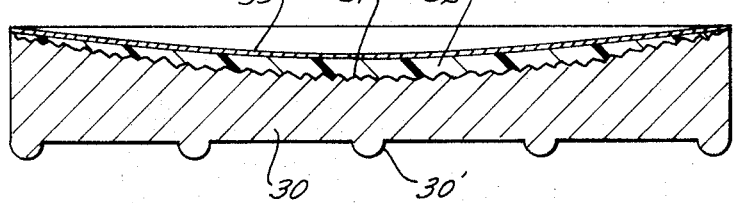
FIG. 4 is a cross-sectional view of another embodiment of our invention.

In FIG. 4 we have illustrated an optical element as prepared in conformity with EXAMPLE 2. It comprises a cast aluminum disk 30 with ribs 30', its spherically concave working surface 31 supporting a resinous layer 32 whose outer surface is overlain by a metallic reflecting film 33. Layer 32 has the dual task of evening out the irregularities of surface 31 and converting its spherical curvature into a paraboloidal one. The reflecting area of this mirror extends only over a small vertex angle, about ±7° with the values given in EXAMPLE 2, so that exact focusing at infinity may be realized with a very thin resin layer.

In the embodiment of FIG. 2, in which the resin layer 22 has the sole purpose of smoothing the reflective surface but does not alter its optical character, the thickness of this layer reduces practically to zero at isolated locations, i.e., at the peaks of the surface of the substrate 20. Such isolated locations exist also in FIG. 4, especially along the periphery of substrate 30. The thickness variations of layer 22 or 32 are generally on the order of microns.

The term "optical surface," as used hereinabove, designates primarily a surface of first-degree or second-degree curvature, i.e., a surface defined by a generatrix which is either a straight line or a segment of a conic section (circle, ellipse, parabola or hyperbola). It is to be understood, however, that surfaces approximating this definition over a substantial portion of their area are also intended to be covered since they, too, may form part of an optical system designed to form virtual or real images from beams of parallel, converging or diverging rays.

We claim:

1. A reflective optical element comprising a rigid metallic support member with a rough working surface; a thin resinous layer adhering to said working surface, said layer having a thickness of less than 1 mm on the average but sufficient to even the irregularities of said working surface and to convert same into an optically effective surface; and a reflecting external metallic film with a thickness of less than 1 $\mu$ adhering to an outer surface of said layer.

2. An optical element as defined in claim 1 wherein said support member consists of aluminum.

3. An optical element as defined in claim 2 wherein said film consists of aluminum.

4. An optical element as defined in claim 2 wherein said support member is disk-shaped and provided with reinforcing ribs opposite said working surface.

5. An optical element as defined in claim 2 wherein said working surface is spherically concave and said outer surface is paraboloidally concave.

6. An optical element as defined in claim 5 wherein said working surface has a radius of curvature of about 1,600 mm. and a diameter of about 200 mm.

7. An optical element as defined in claim 5 wherein said film consists of aluminum.

8. An optical element comprising a rigid support member with a spherically concave working surface and a thin resinous layer on said working surface having a nonuniform thickness starting at substantially zero, said layer having a paraboloidally concave outer surface.

9. An optical element as defined in claim 8, further comprising a reflecting metallic film with a thickness of less than 1 $\mu$ adhering to said outer surface.

10. An optical element as defined in claim 9 wherein said surfaces extend over a vertex angle of approximately ±7°.

* * * * *